United States Patent [19]
Story et al.

[11] 3,862,142

[45] Jan. 21, 1975

[54] METHOD OF REDUCTIVE OZONOLYSIS OF OLEFINS TO PRODUCE CARBONYL COMPOUNDS AND INTERMEDIATE PRODUCTS

[75] Inventors: Paul R. Story, Athens, Ga.; E. A. Whited, Corpus Christi, Tex.; J. A. Alford, Athens, Ga.; Wesley C. Ray, Parkerburg, W. Va.; John R. Burgess, Kingsport, Tenn.

[73] Assignee: Research Corporation, New York, N.Y.

[22] Filed: June 15, 1972

[21] Appl. No.: 262,326

[52] U.S. Cl............ 260/338, 260/340.9, 260/343.5, 260/533 R, 260/586 R, 260/597 R, 260/604 R
[51] Int. Cl............................................. C07d 11/00
[58] Field of Search............. 260/338, 533 R, 586 R

[56] References Cited
OTHER PUBLICATIONS

Murray et al., "Journ. Amer. Chem. Soc." Vol. 87(13), 1965, pp. 3025–6.

Murray et al., "Journ. Amer. Chem. Soc." Vol. 88(13), 1966, pp. 3143–7.

Bailey et al., "Journ. Amer. Chem. Soc." Vol. 89(17), 1967, pp. 4473–9.

Story et al., "Journ. Amer. Chem. Soc." Vol. 93(12), 1971, pp. 3042–6.

*Primary Examiner*—Donald G. Daus
*Assistant Examiner*—James H. Turnipseed

[57] ABSTRACT

A method for the reductive ozonolysis of olefins to produce carbonyls by reacting the olefin with ozone in the presence of a molar excess of a Baeyer-Villiger solvent is disclosed. The method eliminates ozonide formation. A dioxetane is formed as an intermediate and can be isolated.

3 Claims, No Drawings

METHOD OF REDUCTIVE OZONOLYSIS OF OLEFINS TO PRODUCE CARBONYL COMPOUNDS AND INTERMEDIATE PRODUCTS

BACKGROUND OF THE INVENTION

This invention relates to ozonlysis, and more particularly, this invention relates to the ozonolysis of olefins.

It has long been known that olefins can be cleaved by oxidation with ozone. This has been considered one of the most reliable, and certainly one of the most widely used, methods. The ozone rapidly adds to the double bond of the olefin to produce an ozonide. Ozonides, however, are usually unstable and have explosive properties. For this reason, the reaction is usually conducted in the presence of water or of a catalyst so that the ozonide essentially is simultaneously converted into the desired end product, that is, the aldehyde, the ketone, or both, according to the following equation:

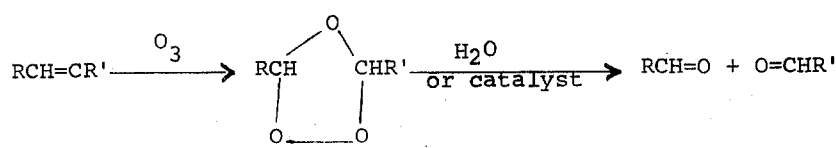

Decomposition of the ozonide with water results in the desired aldehyde or ketone with the third oxygen forming hydrogen peroxide or other peroxide derivative. Alternatively, instead of water being used, a catalytic reduction is often used so that the hydrogen peroxide formed by the reaction will be decomposed. A further method involves the use of an alkyl phosphite instead of water or another catalyst.

For several years the ozonolysis of olefins was interpreted in terms of the Criegee zwitterion mechanism which included the formation of a primary ozonide as the initial ozone-olefin adduct. This primary ozonide has been widely interpreted as having the 1,2,3-trioxolane structure (1.)

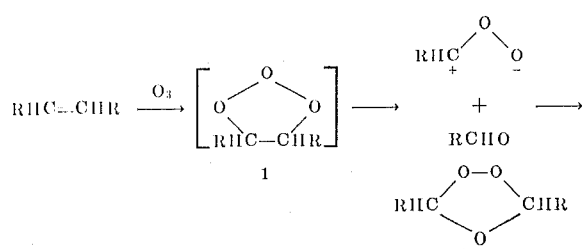

In 1966 it became necessary to question the relative importance of ozonide formation by this mechanistic scheme and a new mechanistic proposal was published. Because of the obvious dependence of ozonide cis/trans ratios on olefin geometry, an aldehyde interchange mechanism was written involving reaction of the molozonide with aldehyde to give a seven-membered ring intermediate 2 which subsequently fragmented to ozonide 3 and aldehyde, e.g.,

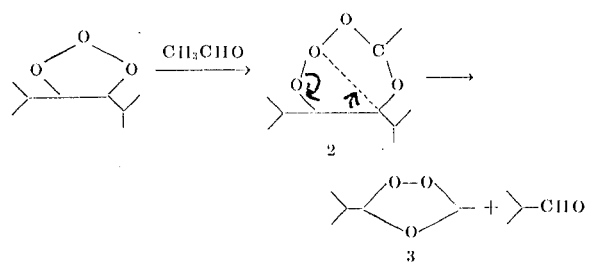

This mechanistic pathway was given substance by subsequent oxygen-18 labeling studies.

Extension of these studies led to an investigation of the ozonolysis of several different types of olefins including ethylidenecyclohexane (4.) Although this olefin might not be expected to yield an ozonide because it is trisubstituted, it, in fact, gives the normal ozonide 5 in high yield; no cross-ozonide is observed.

Following the previously established procedure, the ozonolysis of 4 was carried out in the presence of 1 molar equiv of propionaldehyde-$^{18}O$ and it was found, as in the case of transdiisopropylethylene, that most of the cross-ozonide, cyclohexylidene ethyl ozonide (6), was formed via a pathway which placed the oxygen-18 label in the peroxide bridge, consistent with the new mechanism. None of the other possible cross-ozonide, methyl ethyl ozonide, was detected.

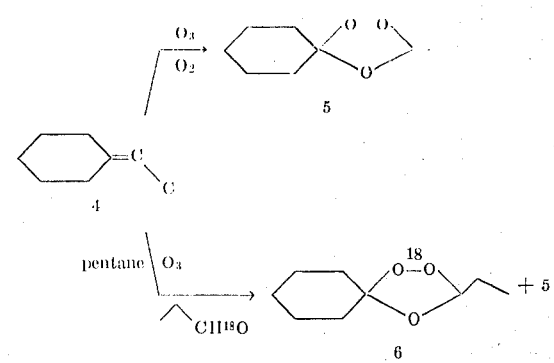

Thus, it can be readily appreciated that the present methods of making carbonyl compounds from olefins by ozonolysis are subject to several important disadvantages notwithstanding the fact that the products can be obtained in 60 to 70% yield. The disadvantages are tied in with the production of the intermediate ozonide which is extremely sensitive and, therefore, for practical purposes not isolatable. Because of this, the reaction must be run in the presence of water or a catalyst which increases the cost and could result in other undesirable by-products.

SUMMARY OF THE INVENTION

Accordingly, it is an object of the present invention to provide a method for the ozonolysis of olefins which is free of the aforementioned and other such disadvantages.

It is a primary object of the present invention to provide a method for the ozonolysis of olefins which does not produce an ozonide, or other explosive peroxides.

It is still another object ot the present invention to provide a method for the ozonolysis of olefins in a single-step reaction without the use of water or catalysts.

It is yet another object of the present invention to provide a method for making carbonyl compounds by the direct ozonolysis of olefins.

Consistent with the foregoing objects of the present invention, it has been found that ozonolysis of an olefin in a molar excess of a Baeyer-Villiger solvent results in the direct production of the desired carbonyl compounds. It has also been found that the reaction proceeds through an intermediate dioxetane compound.

It is, therefore, another object of the present invention to provide certain dioxetane compounds which are useful intermediates in the manufacture of carbonyl compounds and which can also serve as chemical light sources. Dioxetanes on thermal decomposition generate visible light.

DETAILED DESCRIPTION OF THE INVENTION the normal ozonide (5) in high yield. According to the present invention, it has been found, however, that ozonolysis of the same olefin in a four molar or greater excess of propionaldehyde yielded no ozonide products but gave, instead, cyclohexanone (85%), acetaldehyde (62%), and propionic acid in an amount roughly equivalent to the cyclohexanone formed (80%). Generally, the reaction was as follows:

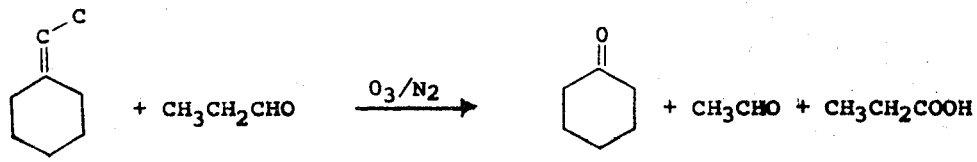

According to the present invention, ozonolysis of olefins in a molar excess of a Baeyer-Villiger solvent results in the direct production of the desired carbonyl compounds. No ozonides are formed and it is not necessary to use water or a catalyst. The term "Baeyer-Villiger" solvents is used to describe solvents which will readily undergo the Baeyer-Villiger oxidation. The Baeyer-Villiger oxidation is a method for the transformation of carbonyl compounds by peracids according to the following scheme:

This effect was not limited to the ozonolysis of ethylidenecyclohexane, but has been observed for many olefins. For example, ozonolysis of a 0.25 molar solution of trans-diisopropylethylene in freshly distilled propionaldehyde using ozone-nitrogen (to minimize aldehyde oxidation) yielded none of the usual ozonide but gave isobutyraldehyde and propionic acid. The ozonolysis of ethylidenecyclohexane and of trans-diisopropylethylene in acetone provided the normal ozonides in good yield, thus eliminating the possiblity

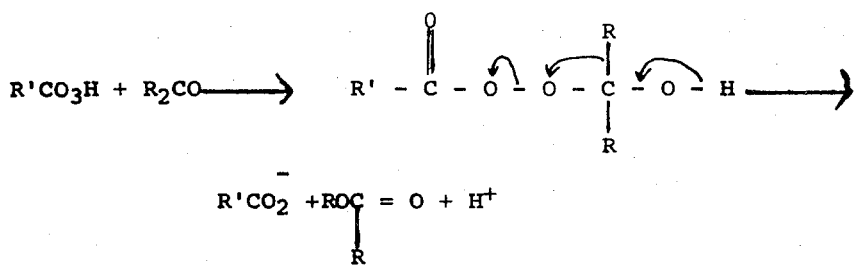

Originally, monopersulfuric acid was used as the oxidizing agent. It was later found that perbenzoic acid could be used. It was also shown that the reaction is intramolecular. In any event, an aldehyde or ketone solvent can easily be characterized by one of ordinary skill in the art as a "Baeyer-Villiger" solvent if it will undergo the Bayer-Villiger oxidation. Such solvents include, but are not limited to, propionaldehyde, butyraldehyde, cyclohexanone, and pinacolone.

Despite the fact that ozonolysis of olefins in equivalent molar amounts of these solvents produces the ozonide, it was surprisingly found that the use of a molar excess of the solvent results in the direct production of the normal carbonyl products in high yield without the production of any ozonide. The reaction should preferably be conducted in an inert atmosphere, the preferred such inert atmosphere being either nitrogen or oxygen.

It has already been noted that the ozonolysis of ethylidenecyclohexane (4) results in the production of that the effect is simply a consequence of solvent polarity.

By contrast, cyclohexanone as a solvent gave quite different results. Ozonolysis of ethylidenecyclohexane in cyclohexanone at $-12°$ C using ozone-nitrogen gave no ozonide product, but did yield 6-hexanolide and acetaldehyde. The lactone is, of course, in the Baeyer-Villiger sense, equivalent to the propionic acid resulting from ozonolyses conducted in propionaldehyde. The reaction was as follows:

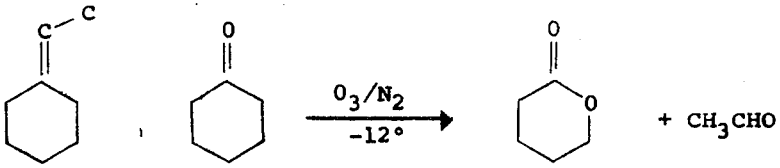

The ozonide-forming reaction is not so easily quenched in all olefinic systems, most notably in those which give high yields of ozonides and which have long been thought to form ozonides, at least in part, by an intramolecular rearrangement process. Once such example is provided by the ozonolysis of methylenecyclohexane (7), which in acetone, ether, or methylene chloride solvents gives cyclohexylidene ozonide (8) in 85% yield. In propionaldehyde solvent the yield of normal ozonide (8) is reduced to about 5% and no cross-ozonide is detectable. In cyclohexanone, however, ther is little, if any, diminution in yield of the ozonide (8).

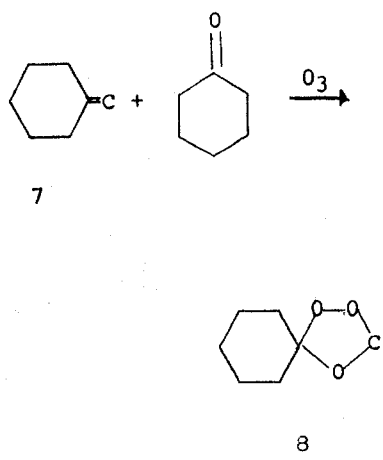

An especially important example is provided by the ozonolysis of trans-di-tert-butylethylene (9). Since the primary ozonide derived from this olefin is reported to be relatively stable, the olefin was ozonized in pentane solution at −78°, the system was flushed with cold nitrogen, and then freshly distilled propionaldehyde precooled to the same temperature was introduced. After about 15 min the solution was warmed to room temperature and found to contain pivaldehyde, priopionic acid, and a low yield of normal ozonide (<10%). No cross-ozonide was in evidence.

By contrast, it is especially noteworthy that both cis- and trans-stilbene, which almost certainly give ozonide products via the Criegee zwitterion route, give high yields of the cross-ozonide, phenyl ethyl ozonide, when ozonized in propionaldehyde.

The mechanism of the reaction according to the present invention has been found to be according to the following equation:

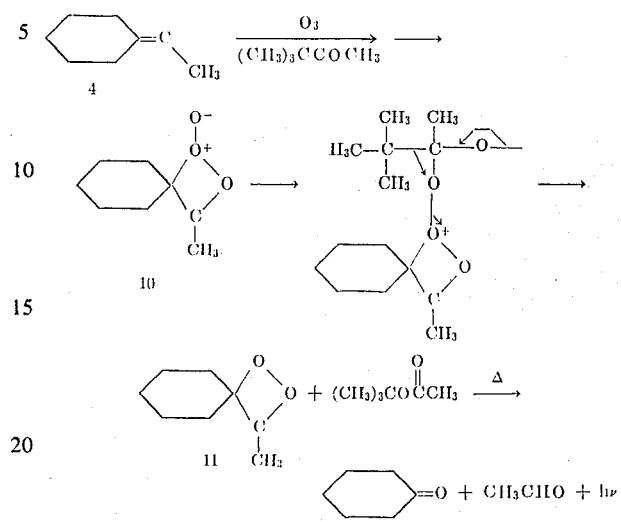

The dioxetane intermediate has been isolated from the ozonolysis of several different olefins and it has been determined that the production of the dioxetane is a general phenomenon for these ozonolysis reactions. The general scheme is represented by the following example.

EXAMPLE

Ethylidenecyclohexane, 0.25 molar in pinacolone solvent at −45°C was ozonized using ozone in nitrogen. The ozonolysis yielded a colorless-viscous liquid after evaporative removal of most of the pinacolone at low temperature (0°–10°C). GPC analysis of the residue indicated the presence of only cyclohexanone and acetaldehyde in approximately equal proportions, along with

TABLE 1

Ozonolysis of Olefins in the Presence of Excess Aldehydes and Ketones

| Olefin | Concn. M | Solvent | T, °C | Ozone carrier | Normal ozonide yield, % | Cross-ozonide yield, % | Other products (yield, %) |
|---|---|---|---|---|---|---|---|
| 4 | 0.25 | Propionaldehyde | −70 | $N_2$ | None | None | Cyclohexanone(75) Acetaldehyde (62) |
| 4 | 0.20 | Acetaldehyde | −70 | $N_2$ | 75 | | Cyclohexanone (low) |
| 4 | 0.25 | Butyraldehyde | −70 | $O_2$ | None | None | Not determined |
| 4 | 0.15 | Butyraldehyde | −70 | $N_2$ | None | None | Not determined (n.d.) |
| 4 | 0.30 | Butyraldehyde | −70 | $N_2$ | None | None | Butyric acid (high) Cyclohexanone (high) Acetaldehyde (high) |
| 4 | 0.25 | 3,3-Dimethyl-2-butane | Fp | $O_2$ | None | N.d. | N.D. |
| 4 | 0.25 | Cyclohexanone | −15 | $O_2$ | None | None | 6-Hexanolide (50) Acetic acid (low) |
| 4 | 0.25 | Cyclohexanone | −12 | $N_2$ | None | None | 6-Hexanolide(50%) |
| 7 | 0.31 | Pentane | −70 | $O_2$ | 85 | N.d. | Cyclohexanone + cyclohexylidene epoxide (total = 5%) |
| 7 | 0.25 | Propionaldehyde | −78 | $N_2$ | Low | None | |
| 7 | 0.20 | Cyclohexanone | −15 | $O_2$ | 75 | None | None observed |
| 7 | 0.20 | Acetaldehyde | −70 | $N_2$ | 40 | 42 | |
| 7 | 0.31 | Acetone | −70 | $O_2$ | 85 | None | |
| cis-Diisopropyl-ethylene | 0.25 | Propionaldehyde | −78 | $N_2$ | None | 26 | Propionic acid (23) Isobutyraldehyde (37) |
| trans-Diisopropyl-ethylene | 0.25 | Propionaldehyde | −78 | $N_2$ | None | Trace | Propionic acid (~ 50) |
| 8 | 0.25 | Propionaldehyde | −78 | $N_2$ | Trace | Trace | Pivaldehyde (n.d.) Propionic acid (n.d.) |
| cis-Stilbene | 0.1 | $CCl_4$ | −20 | $N_2$ | ~ 50 | | Benzaldehyde (n.d.) |
| cis-Stilbene | 0.1 | Propionaldehyde | −20 | $N_2$ | None | ~ 48 | Benzaldehyde |
| trans-Stilbene | 0.05 | $CCl_4$ | −20 | $N_2$ | ~ 50 | | Benzaldehyde |
| trans-Stilbene | 0.05 | Propionaldehyde | −20 | $N_2$ | None | ~ 40 | Benzaldehyde |

4 - ethylidenecyclohexane
7 - methylenecyclohexane
8 - cyclohexylidene ozonide some remaining pinacolone and a trace of t-butyl acetate. Analysis of the separated pinacolone revealed that it contained an equivalent (relative to cyclohexanone) of t-butyl acetate.

The neat residue, upon very rapid heating (placed in a hot bath at 170°C) emitted a bluish-white light (visible in a darkened room) and erupted violently to discharge acetaldehyde to the atmosphere. Similar heating of a decane solution containing the ozonolysis residue and 9,10-diphenylanthracene, 9,10-dibromoanthracene, or rubrene produced a very bright luminescence with a duration of 1-2 minutes. Neither ozonides nor ketone diperoxides have been observed to luminesce during thermal decomposition.

The nmr of the crude residue also served to confirm the dioxetane structure. A multiplet centered at $\delta = 5.2$ compares well with the methine hydrogen quartet for trimethyl-1,2-dioxetane, reported at $\delta = 5.22$. The methyl doublet for 3 at $\delta = 1.22$ also compares favorably with the corresponding doublet for trimethyl-1,2-dioxetane found at $\delta = 1.35$. The crude residue was devoid of ozonide and acetaldehyde as determined by nmr, gpc, and infrared analysis. The yield of dioxetane (11) was estimated at 50–75%. This compound is ethylidene - 1,2-dioxetane.

Lithium aluminum hydride reduction of the crude residue further served to confirm the assignment of structure 11 to the residue. Hydride reduction in ether yielded, in the proportions indicated (mole percent), ethylidene cyclohexane glycol (12) (18%), cyclohexanol (40%), and ethanol (31%). For comparison, authentic glycol (12) was prepared by hydrolysis of the epoxide of ethylidene cyclohexane. By contrast, hydride reduction of

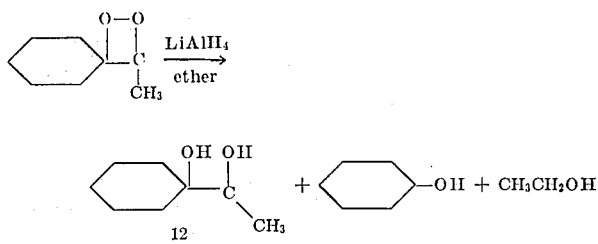

ozonide or of the presumed 1,2,3-trioxolane does not yield glycols.

The ozonolysis of a variety of olefins in pinacolone and other Baeyer-Villiger solvents has been examined and it is invariably found that ozonide is not formed and that the dioxetane is detectable. Routinely, the dioxetane is detected by light emission on sudden warming of the ozonolysis residue after removal of the solvent at low temperature. If the dioxetane is lower boiling than the solvent, it is concentrated by low temperature distillation. Ozonolysis of 2-methylbutene, cyclopentene, or indene in pinacolone results in light emission on warming the reaction residues and glycol formation on hydride reduction.

Trimethyl-1,2-dioxetane and 11 were also prepared by a conventional method and it was found that hydride reduction yields the corresponding glycol in both cases. The dioxetanes so prepared are identical in all respects to those obtained by ozonolysis.

Thus, it should be apparent from the foregoing detailed description that the objects set forth hereinabove have been successfully achieved. Moreover, while there is shown and described present preferred embodiments of the invention it is to be distinctly understood that the invention is not limited thereto but may be otherwise variously embodied and practised within the scope of the following claims.

The work on which this application was based was financed in whole or in part by the Department of Health, Education and Welfare.

Accordingly, what is claimed is:

1. A method for the reductive ozonolysis of an olefin selected from the group consisting of ethylidene cylcohexane, 2-methylbutene, cyclopentene, indene and trans or cis-diisopropylethylene, comprising the step of reacting said olefin with ozone at a temperature of between about 0° C and about −100° C, in the presence of a molar excess of a solvent selected from the group consisting of pinacolone, propionaldehyde, cyclohexanone and butyraldehyde, in an inert atmosphere.

2. A method according to claim 1 wherein said reaction is conducted in an atmosphere of nitrogen or oxygen.

3. A method for the production of ethylidene-1, 2-dioxetane which comprises reacting ethylidene cyclohexanone with ozone at a temperature of between 0°C and about −100° C in the presence of a molar excess of a solvent selected from the group consisting of pinacolone, propionaldehyde, cyclohexanone and butyraldehyde, in an inert atmosphere.

* * * * *

UNITED STATES PATENT OFFICE
CERTIFICATE OF CORRECTION

Patent No. 3,862,142  Dated January 21, 1975

Inventor(s) Paul R. Story, E.A. Whited, J.A. Alford, Wesley C. Ray and John R. Burgess It is certified that error appears in the above-identified patent and that said Letters Patent are hereby corrected as shown below:

Cancel "[22] Filed: June 15, 1972."

Insert -- [22] Filed: June 19, 1972 --.

Signed and Sealed this ninth Day of August 1977

[SEAL]

Attest:

RUTH C. MASON
Attesting Officer

C. MARSHALL DANN
Commissioner of Patents and Trademarks